(12) United States Patent
Lundheim et al.

(10) Patent No.: US 12,037,878 B2
(45) Date of Patent: Jul. 16, 2024

(54) ADAPTER ASSEMBLY, FLOWLINE CONNECTOR ASSEMBLY AND SUBSEA PRODUCTION SYSTEM

(71) Applicant: AKER SOLUTIONS AS, Lysaker (NO)

(72) Inventors: Lars Timberlid Lundheim, Borgen (NO); Shelly Holmesland, Nesbru (NO)

(73) Assignee: AKER SOLUTIONS AS, Lysaker (NO)

( * ) Notice: Subject to any disclaimer, the term of this patent is extended or adjusted under 35 U.S.C. 154(b) by 229 days.

(21) Appl. No.: 17/637,810

(22) PCT Filed: Aug. 28, 2020

(86) PCT No.: PCT/NO2020/050219
§ 371 (c)(1),
(2) Date: Feb. 24, 2022

(87) PCT Pub. No.: WO2021/040535
PCT Pub. Date: Mar. 4, 2021

(65) Prior Publication Data
US 2022/0282596 A1    Sep. 8, 2022

(30) Foreign Application Priority Data

Aug. 29, 2019   (GB) ...................................... 1912394

(51) Int. Cl.
*E21B 43/013*   (2006.01)
*F16L 1/26*   (2006.01)

(52) U.S. Cl.
CPC .............. *E21B 43/013* (2013.01); *F16L 1/26* (2013.01)

(58) Field of Classification Search
CPC .... E21B 43/013; E21B 33/035; E21B 33/038; F16L 1/26
See application file for complete search history.

(56) References Cited

U.S. PATENT DOCUMENTS

| | | | |
|---|---|---|---|
| 4,175,620 | A | 11/1979 | Nolan, Jr. et al. |
| 4,192,383 | A | 3/1980 | Kirkland et al. |
| 4,615,646 | A | 10/1986 | Langner |
| 4,820,083 | A | 4/1989 | Hall |
| 4,832,124 | A | 5/1989 | Davis |

(Continued)

FOREIGN PATENT DOCUMENTS

| | | |
|---|---|---|
| GB | 2 151 288 A | 7/1985 |
| GB | 2 319 795 A | 6/1998 |

(Continued)

*Primary Examiner* — Benjamin F Fiorello
(74) *Attorney, Agent, or Firm* — Norman B. Thot

(57) ABSTRACT

An adapter assembly for connecting a flowline which includes an end portion to a subsea tree which includes a fluid line connector. The adapter assembly includes an adapter base, a first connection element which is connected to the adapter base and which connects to the fluid line connector of the subsea tree, and a flowline connector assembly which includes a second connection element which connects to the end portion of the flowline. The flowline connector assembly is attached to the adapter base. The adapter assembly connects to the subsea tree via the first connection element.

16 Claims, 12 Drawing Sheets

(56) References Cited

U.S. PATENT DOCUMENTS

| | | | |
|---|---|---|---|
| 5,192,167 A * | 3/1993 | da Silva | E21B 43/017 |
| | | | 166/341 |
| 5,593,249 A | 1/1997 | Cox et al. | |
| 5,971,077 A | 10/1999 | Lilley | |
| 6,098,715 A | 8/2000 | Seixas et al. | |
| 6,481,504 B1 | 11/2002 | Gatherar | |
| 8,151,890 B2 | 4/2012 | Spencer et al. | |
| 8,672,038 B2 | 3/2014 | Tan et al. | |
| 9,415,848 B2 * | 8/2016 | Jewell | B63G 8/001 |
| 10,400,528 B2 * | 9/2019 | Kalia | E21B 43/12 |
| 2004/0251030 A1 | 12/2004 | Appleford et al. | |
| 2010/0018693 A1 | 1/2010 | Duncan et al. | |
| 2015/0292291 A1 | 10/2015 | Donald et al. | |
| 2020/0123867 A1 | 4/2020 | Riley et al. | |

FOREIGN PATENT DOCUMENTS

| | | |
|---|---|---|
| WO | WO 00/47864 A1 | 8/2000 |
| WO | WO 2017/209785 A1 | 12/2017 |

* cited by examiner

ADAPTER ASSEMBLY, FLOWLINE CONNECTOR ASSEMBLY AND SUBSEA PRODUCTION SYSTEM

CROSS REFERENCE TO PRIOR APPLICATIONS

This application is a U.S. National Phase application under 35 U.S.C. § 371 of International Application No. PCT/NO2020/050219, filed on Aug. 28, 2020 and which claims benefit to Great Britain Patent Application No. 1912394.2, filed on Aug. 29, 2019. The International Application was published in English on Mar. 4, 2021 as WO 2021/040535 A1 under PCT Article 21(2).

FIELD

The present invention relates to an adapter assembly for connecting a flowline to a subsea tree at a subsea installation, to a flowline connector assembly, and to a subsea production system.

BACKGROUND

In general, a subsea tree or a subsea Christmas tree (hereinafter referred to as a "valve tree" or simply a "tree", which is commonly abbreviated as "XT" or "XMT") is a system of valves, flow paths, and connectors installed on a subsea wellhead to control the flow of fluid from a reservoir. A flowline connector is commonly used to connect subsea flowlines to the subsea tree via suitable jumpers. Typically, an end of each flowline is generally lowered vertically to the subsea tree from a vessel, and the flowline is then laid out horizontally between the points to be interconnected, thereby providing safe and leak-proof connections between the subsea tree and flowlines extending to other components of, for example, a subsea production system.

Flowline connectors are typically connected to valve arrangements on one or more sides of the subsea tree. Flowlines can, for example, connect a manifold to a XT to convey gas/fluids to or from another component or a remote location. Connectors for such flowlines can be placed at sides of the XT pointing vertically downwards or upwards, or connectors arranged for horizontal connections. A given flowline and connection may transmit petroleum fluids, other well fluids, hydraulic fluids for XT systems, chemicals (e.g., for injection into the well), or other fluids.

Documents which may be useful for understanding the field of technology include U.S. Pat. Nos. 6,481,504, 6,098,715, 5,593,249, 4,615,646, 8,672,038, WO 2017/209785, and U.S. Pat. No. 8,151,890.

In view of the trends in the petroleum industry to exploit more remote or harsh locations (e.g., in deepwater or arctic regions), and the desire to provide higher utilization of existing fields, a continuous need exists in the industry for improved technology in relation to subsea well arrangements and production systems. This includes, for example, aspects of operational reliability, design flexibility, or operational efficiency.

SUMMARY

An aspect of the present invention is to provide improvements over the state of the art in at least one of the abovementioned areas, or at least to provide alternatives to known technology.

In an embodiment, the present invention provides an adapter assembly for connecting a flowline which comprises an end portion to a subsea tree which comprises a fluid line connector. The adapter assembly includes an adapter base, a first connection element which is connected to the adapter base and which is configured to connect to the fluid line connector of the subsea tree, and a flowline connector assembly comprising a second connection element which is configured to connect to the end portion of the flowline. The flowline connector assembly is attached to the adapter base. The adapter assembly is configured to connect to the subsea tree via the first connection element.

BRIEF DESCRIPTION OF THE DRAWINGS

The present invention is described in greater detail below on the basis of embodiments and of the drawings in which.

DETAILED DESCRIPTION

Figure 1A:
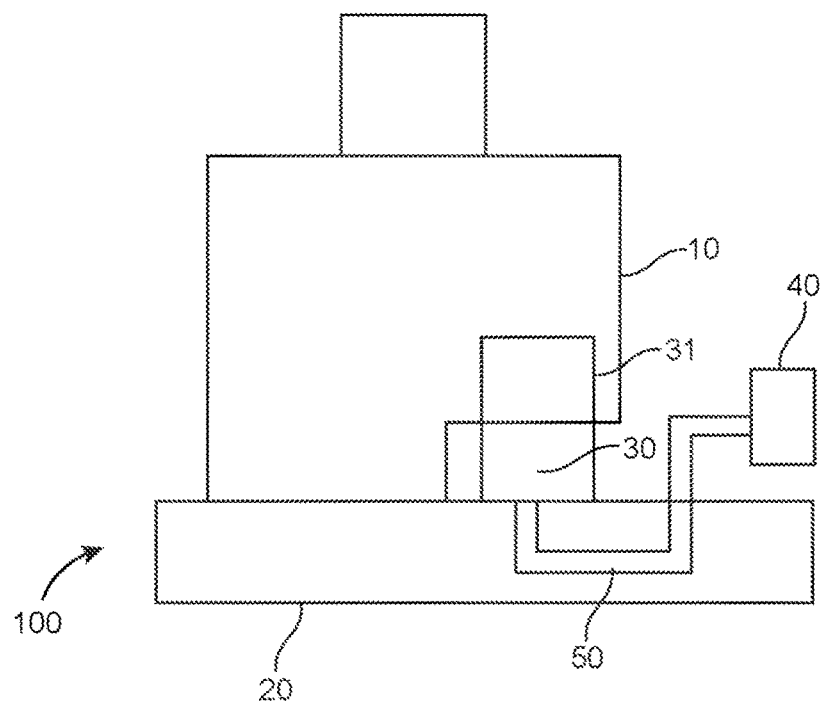
FIG. 1A illustrates schematically an adapter assembly for a subsea tree.

The present invention provides an adapter assembly for connecting a flowline to a subsea tree, the adapter assembly comprising: an adapter base; a first connection element connected to the adapter base and configured for connecting to a fluid line connector on the subsea tree; a flowline connector assembly with a second connection element configured for connecting to an end portion of the flowline, wherein the flowline connector assembly is attached to the adapter base; the adapter assembly being configured for connecting to the subsea tree through the first connection element.

The present invention also provides a subsea production system comprising a plurality of subsea trees, wherein at least one of the plurality of subsea trees is provided in a multi-slot template and at least another of the subsea trees is provided in a single-slot foundation, wherein at least one of the plurality of subsea trees comprises an adapter assembly.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the present invention. The terms are used for the reader's convenience only and shall not be limiting.

Figure 1B:
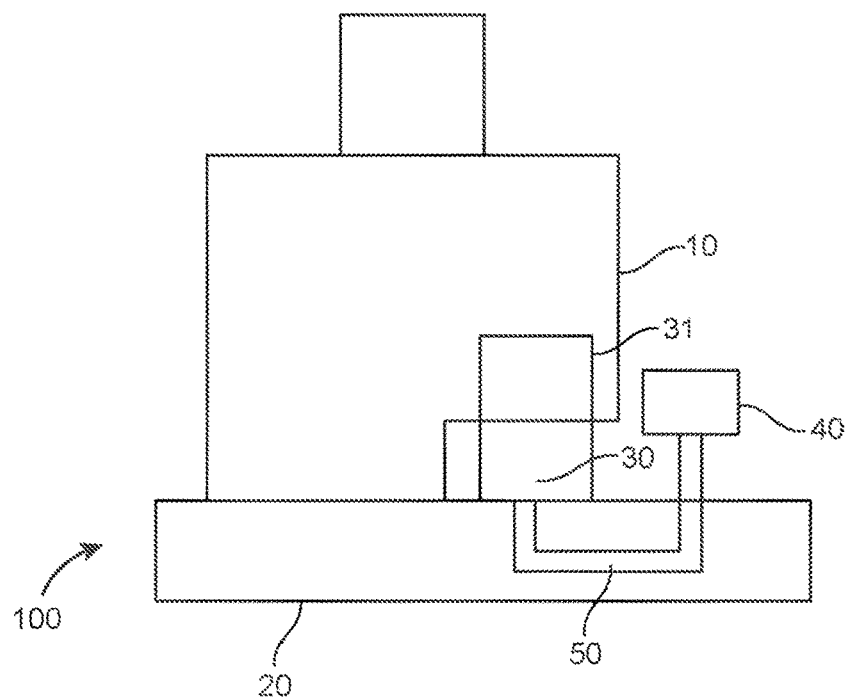
FIG. 1B illustrate schematically an adapter assembly for a subsea tree.

FIGS. 1A and 1B illustrate an adapter assembly 100 for a subsea tree 10. The adapter assembly 100 is connected at a bottom portion of the subsea tree 10 as illustrated in FIGS. 1A and 1B. Referring initially to FIGS. 1A and 1B, the adapter assembly 100 comprises an adapter base 20, a first connection element 30, a flowline connector assembly 40, and flowloops 50 between the first connection element 30 and the flowline connector assembly 40.

The adapter base 20 is a frame that supports a tie-in connection system and hubs with transmitting flowloops 50. The flowloops 50 may be a fluid connection comprising a single fluid conduit, or may comprise a plurality of fluid conduits. The adapter base 20 may be interchangeable and customizable for each type of tie-in system. The adapter base 20 plate can have shimming capabilities in order to make mounting adjustments and relaxing tolerances.

The first connection element 30 is supported by the adapter base 20 and is connected to the subsea tree 10 with a substantially vertical connection. The first connection element 30 interfaces with a corresponding fluid line connector 31 on an underside of the subsea tree 10. The flowline connector assembly 40 can, for example, be positioned or attached at an outer perimeter, for example, on a side of the adapter base 20 as illustrated in FIGS. 1A and 1B. The flowline connector assembly 40 comprises a second connection element 42 (which is not shown in FIGS. 1A and 1B but which is described below) which connects to an end portion of a subsea flowline (shown as 67-70 in FIG. 7).

In an embodiment of the present invention, the flowline connector assembly 40 is oriented for horizontal connection (tie-in) towards the flowline, as shown in FIG. 1A. In that embodiment, the second connection element 42 is arranged horizontally. The flowline connector assembly 40 is alternatively oriented for vertical connection (tie-in) towards the flowline, as shown in FIG. 1B. In that embodiment, the second connection element 42 is arranged vertically.

The flowloops 50 transmit fluid flow between the vertical connection at the underside of the subsea tree 10 to the flowline connector assembly 40. The number and type of fluid conduits in the flowloops 50 may vary depending on the required functionality of the connection.

Figure 2:
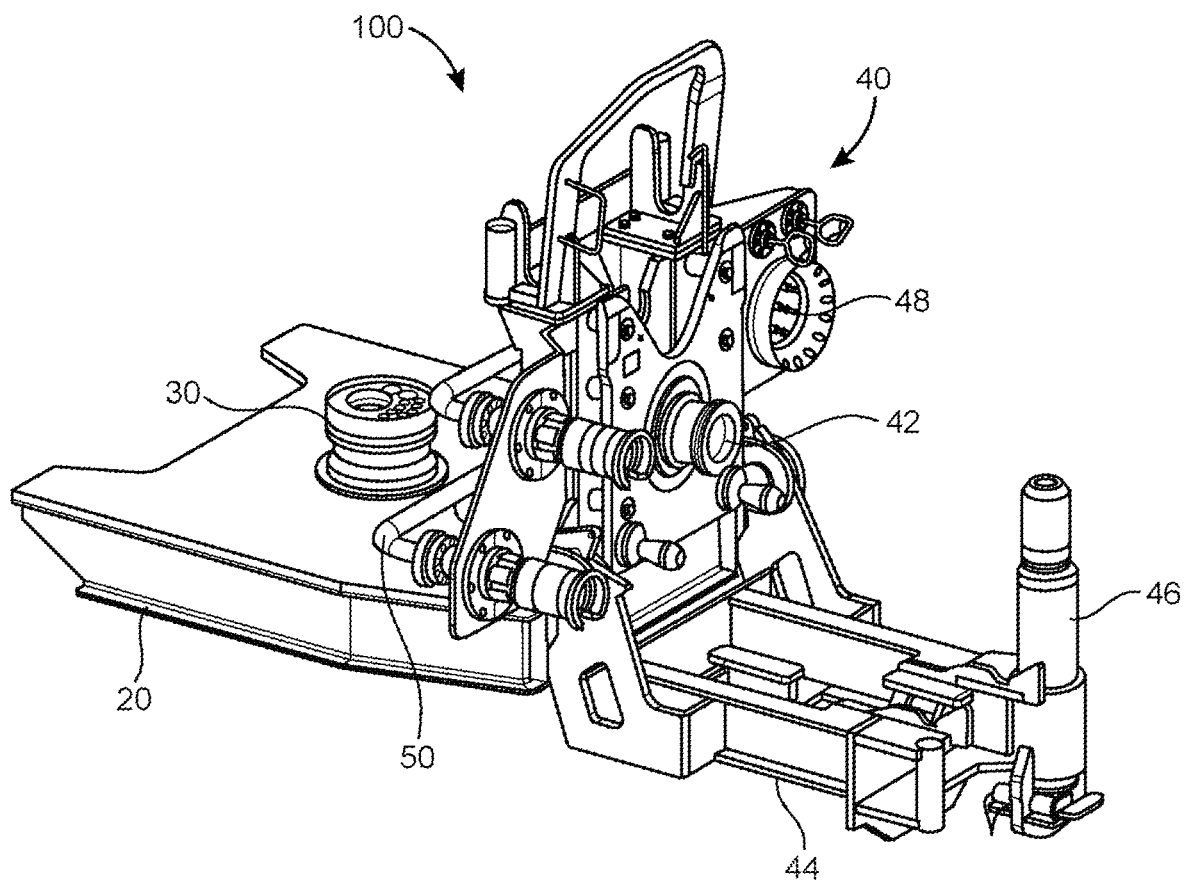
FIG. 2 illustrates an adapter assembly.

FIG. 2 is an illustration of an adapter assembly 100 according to an embodiment of the present invention. As depicted in FIG. 2, the adapter base 20 holds the first connection element 30, the flowline connector assembly 40, and the flowloops 50 between the first connection element 30 and the flowline connector assembly 40. The first connection element 30 is arranged fixed on the adapter base 20, and the flowline connector assembly 40 is in this embodiment fixed at a side end of the adapter base 20.

Figure 3:
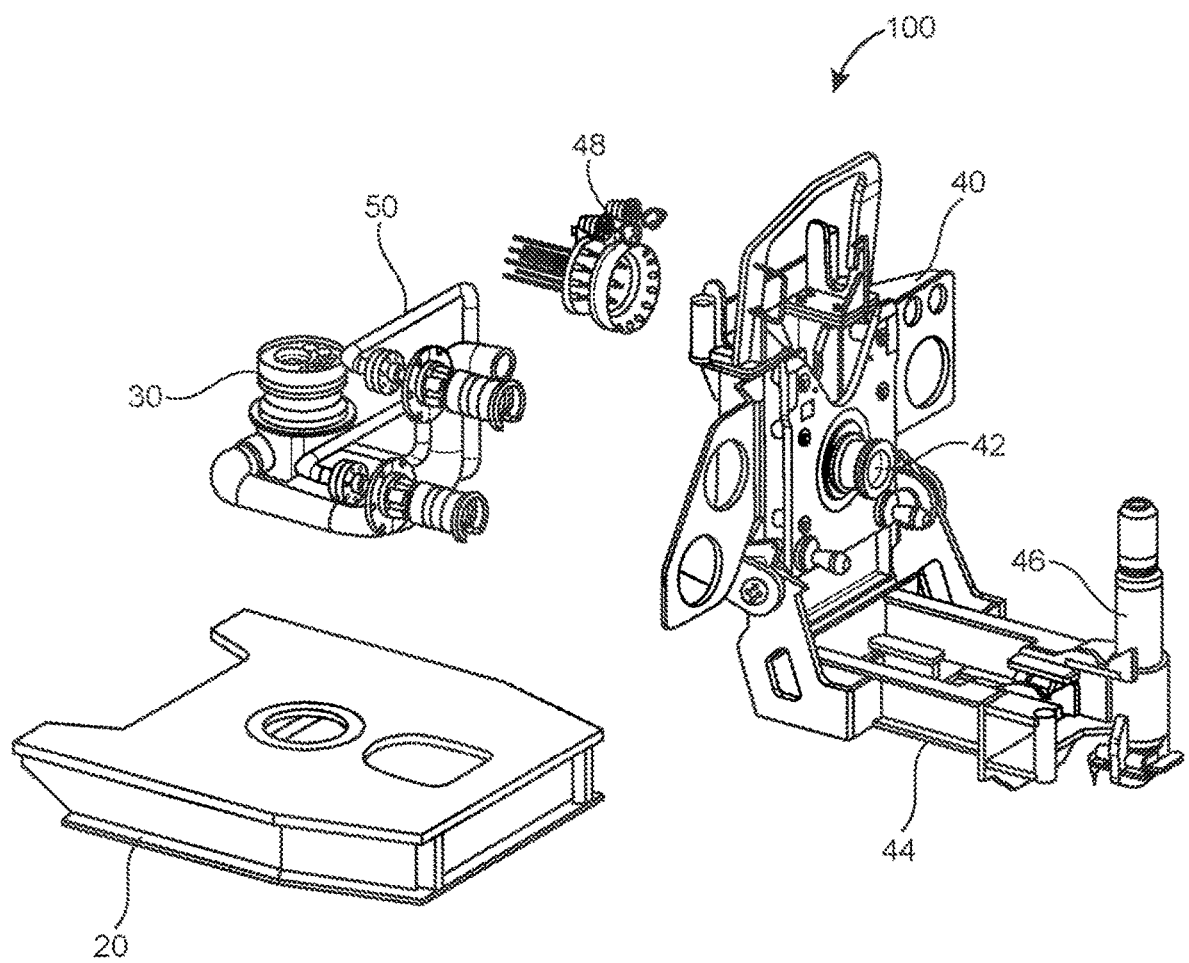
FIG. 3 shows a section view of various components of the adapter assembly.

FIG. 3 is an exploded view of various components of the adapter assembly 100. The adapter base 20 can be a substantially rectangular frame type structure and may include suitable means or holes for connecting the first connection element 30 and the flowline connector assembly 40 thereto. The adapter base 20 can have different shapes, and the dimensions of the adapter base 20 may be varied depending on required functionality of flowline connection.

The first connection element 30 is fixed in a vertical orientation on the adapter base 20. The first connection element 30 can then be connected vertically to a corresponding fluid line connector 31 (see FIGS. 1A and 1B) at the underside of the subsea tree 10. The transmitting flowloops 50 extend from the first connection element 30 to the flowline connector assembly 40 as illustrated in FIGS. 1A-3.

The flowline connector assembly 40 can have a metal body structure and include a second connection element 42 which can be connected to an end portion of a subsea flowline. The flowline connector assembly 40 can further include suitable support means or holes for supporting and holding the flowloops 50 from the first connection element 30.

A multiple quick connector (MQC) 48 or stab plate may be provided on the flowline connector assembly 40 for other fluid transfer or other functions, such as control. The MQC 48 may, for example, be ROV-accessible. The second connection element 42 may optionally or additionally itself be multibore, with the first and second connection elements 30, 42 being arranged to transmit different types of fluids between the subsea tree 10 and the subsea flowline.

In an embodiment of the present invention, the flowline connector assembly 40 can, for example, comprise a guide pin 46 which is arranged to assist with the connection of a subsea flowline to the flowline connector assembly 40. The subsea flowline may have an end connector which is lowered from a vessel and which requires alignment with the flowline connector assembly 40 before making up the fluid connection (i.e., before engaging the second connection element 42). A guide pin 46 on the flowline connector assembly 40 can engage with a corresponding receptacle on the subsea flowline end connector to align the respective units before making up the fluid connection. The subsea flowline may optionally have a guide pin, and a pin receptacle is arranged on the flowline connector assembly 40. The guide pin and receptacle may be substantially vertically arranged, as can be seen in FIG. 2. To aid installation, the receptacle may comprise an inlet section having an increased cross-section, such as a funnel or a cone-shaped inlet, to guide the guide pin into the receptacle. The guide pin 46 may thus be inserted into the funnel (which is not here shown) which provides for easy guiding and positioning of the flowline relative to the flowline connector assembly 40.

A guide pin could optionally be placed at a structure under the XT, i.e., on a structure onto which the XT lands. A guide pin may not be necessary, however, if sufficient accuracy for connection can be achieved by other means, such as with ROV assistance.

The guide pin 46 (or receptacle) may be arranged on a foldable unit 44, as illustrated in FIG. 2. The foldable unit 44 is movable between a first, extended position in which the foldable unit 44 with the guide pin 46 extends outwardly from the adapter base 20, and a second, retracted position in which the foldable unit with the guide pin 46 is retracted towards the adapter base 20. The extended position is illustrated in FIG. 2, while the retracted position is illustrated in FIG. 4.

The foldable unit 44 can, for example, be a frame type structure which can be rotatably fixed to the flowline connector assembly 40, as illustrated. The foldable unit 44 can alternatively be a slidable or telescopically extendable structure.

Figure 4:
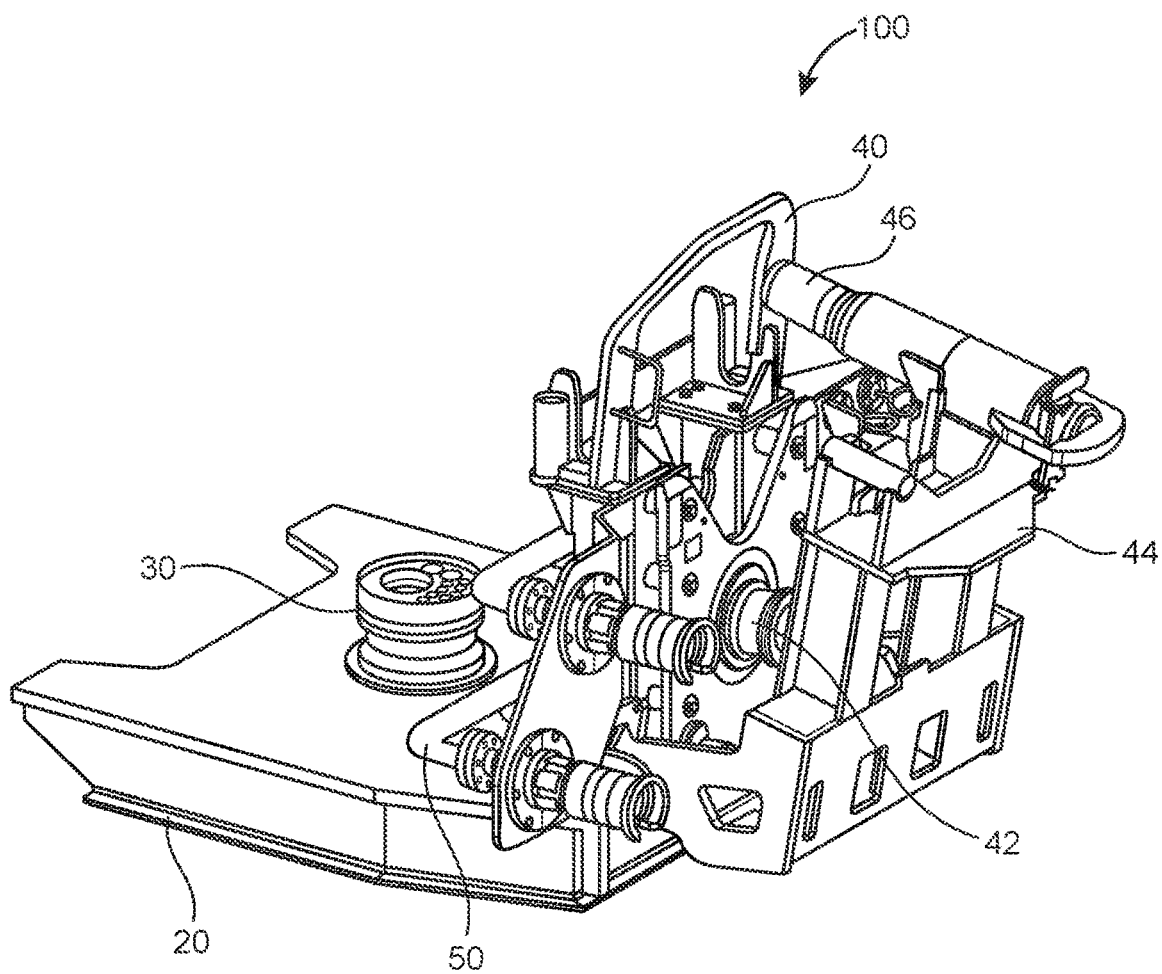
FIG. 4 shows a perspective view of the adapter assembly.

In this embodiment, the foldable unit 44, having the guide pin 46, may thereby be folded towards the second connection element 42, as illustrated in FIG. 4, thereby reducing the dimensions of the adapter assembly 100 for easier transportation and installation. For example, during installation through a moon pool on a vessel, the footprint of the assembly and tree may be smaller by retracting the foldable unit 44.

Figure 5:
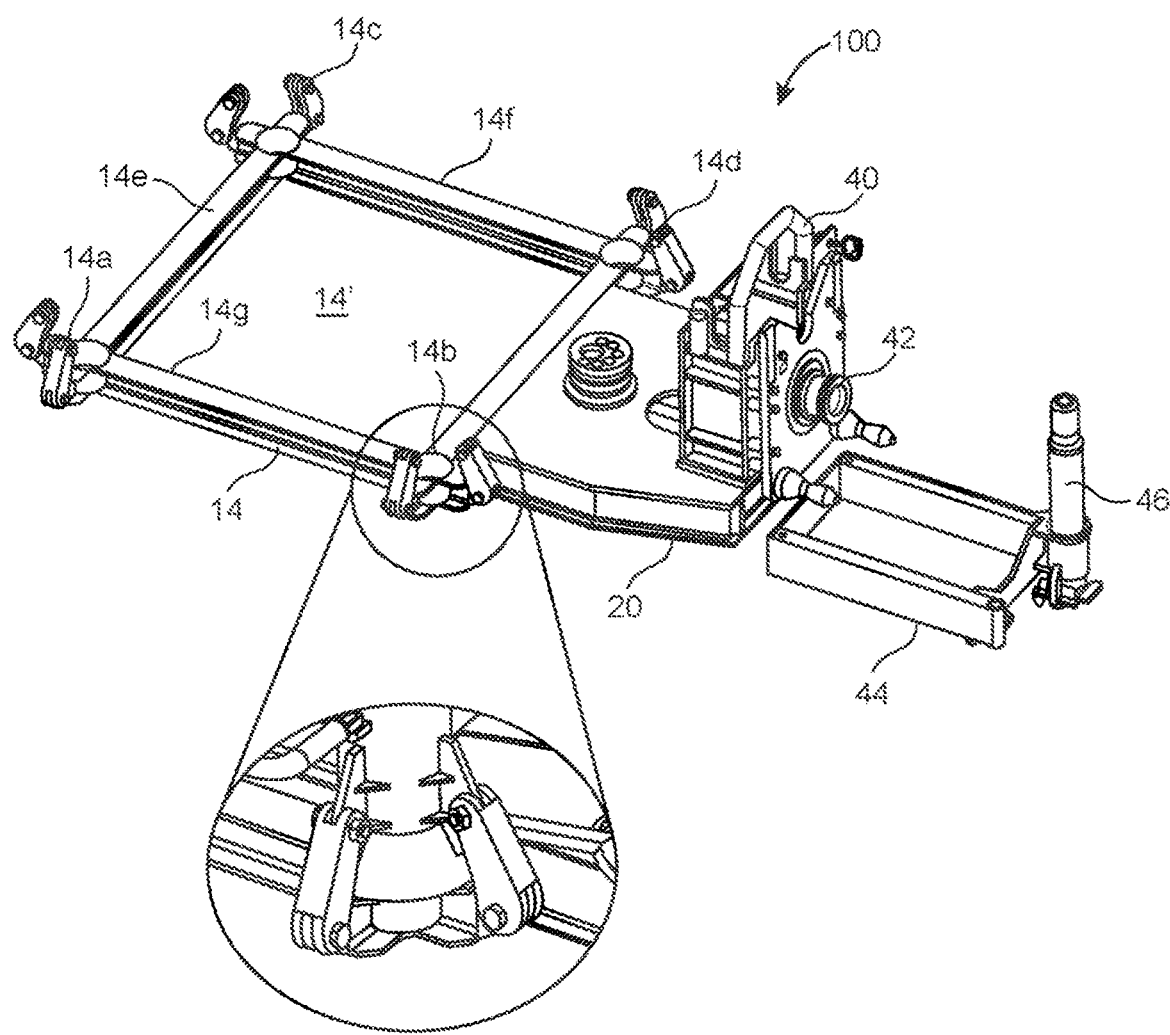
FIG. 5 illustrates an adapter assembly having a frame for holding a subsea tree.

FIG. 5 illustrates an embodiment of the adapter assembly 100. In FIG. 5, the adapter assembly 100 comprises a frame for holding the subsea tree 10. As depicted in FIG. 5, the adapter base 20 comprises a frame 14 which includes mounting brackets 14a, 14b, 14c and 14d, along the corners of the frame 14. The frame 14 can be a base frame which can be clamped on to the subsea tree 10 through the mounting brackets 14a-14d. The mounting brackets 14a-14d can be a part of the frame 14 and be used for fixing or clamping the adapter assembly 100 to the subsea tree 10.

In an embodiment of the present invention, the frame 14 may be a part of the adapter base 20. It should be noted that the frame 14 may be welded to the adapter base 20, or fixed to it by other means. The frame 14 may alternatively be a separate frame which is attached to the subsea tree 10 together with the adapter base 20.

Figure 6:
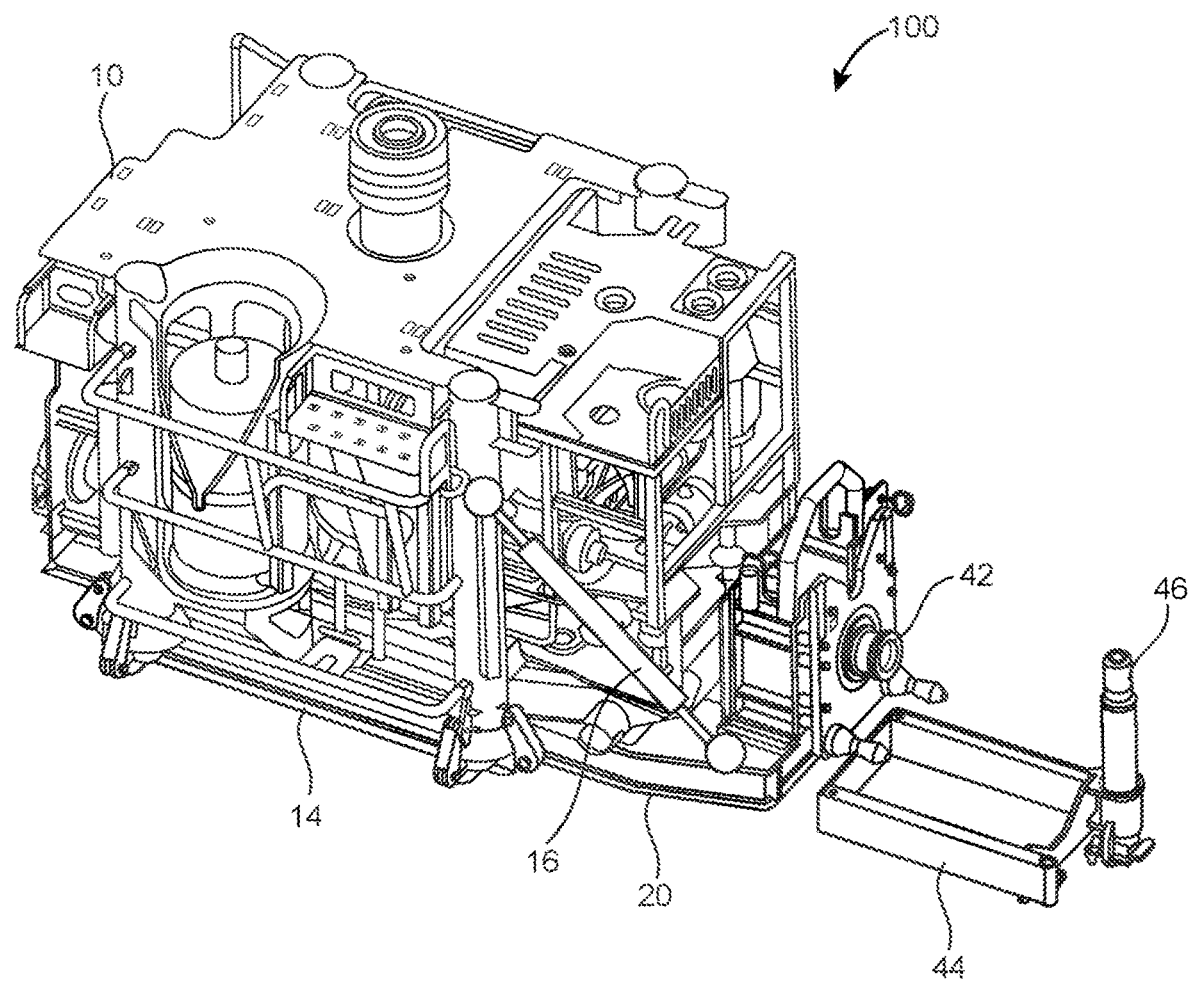
FIG. 6 illustrates the adapter assembly attached to a subsea tree.

The frame 14 can be attached at the bottom of the subsea tree 10. The mounting brackets 14a-14d are clamped to the tail structure of the subsea tree 10 to hold the subsea tree, as illustrated in FIGS. 5 and 6. Other types of connectors may optionally be used to fix the frame 14 to the subsea tree 10, such as bolts, clamps or the like. The frame 14 allows the subsea tree 10 to stand on its own on a flat surface, such as a vessel deck, with the frame 14 fixed through the mounting brackets 14a-14d during transportation and installation of the subsea tree 10.

FIG. 6 illustrates the adapter assembly 100 attached to the subsea tree 10. As depicted in FIG. 6, the adapter assembly 100 is attached at the bottom portion of the subsea tree 10. The adapter base 20 and the frame 14 thus holds the subsea tree 10.

The frame 14 extends about at least a part of an outer perimetry of the subsea tree 10, and has a central opening 14' (see FIG. 5) adjacent to a central part of the underside of the subsea tree 10. This allows the subsea tree 10 to be installed onto a wellhead in the ordinary manner without interference from the frame 14, i.e., where the underside of the subsea tree 10 is fixed onto a wellhead (or other well structure).

The frame 14 may extend around the entire perimetry of the subsea tree 10, as is the case in the embodiment shown in FIGS. 5 and 6, or it may extend around only parts of the perimetry of the subsea tree 10. For example, a beam section 14e (see FIG. 5) opposite the flowline connector assembly 40 may be omitted such that only two parallel "legs" 14f,14g extend outwardly from the adapter base 20 side to support the subsea tree 10.

In an embodiment of the present invention, one or more tension rods 16 (see FIG. 6) may be used as a support due to applied tie-in loads during connection of the adapter assembly 100 to the subsea tree 10.

The adapter assembly 100 is thus connected at the bottom portion of the subsea tree 10, which facilitates the subsea flowline to be connected to the flowline connector assembly 40 mounted on the adapter base 20 of the adapter assembly 100. With the first connection element 30 on the adapter base 20, fixed vertically to the subsea tree 10, and the flowloops 50 which are extended horizontally from the first connection element 30 to the flowline connector assembly 40, the flowline connector assembly 40 can be connected to an end portion of the subsea flowline through the second connection element 42. Access to fluid connectors on the underside (or, in other embodiments, the side) of the subsea tree 10 can therefore be provided more easily for connection to a subsea flowline.

The frame 14 may be configured to provide a stable support for the subsea tree 10 when stored on, for example, a deck of a vessel. This can be achieved by providing the frame 14 with an extension so that the subsea tree 10 can rest entirely on the frame 14 and on the adapter base 20 when transported or stored. This avoids the need for other support structures between the subsea tree 10 and the underlying surface (e.g., purpose-made support structures for the subsea tree 10), for example, when transporting it on a vessel.

The adapter assembly 100 of the present invention thus provides a simple and convenient way of attaching to a subsea tree 10 that must be connected to and/or mounted on further equipment located on the seabed.

Figure 7:
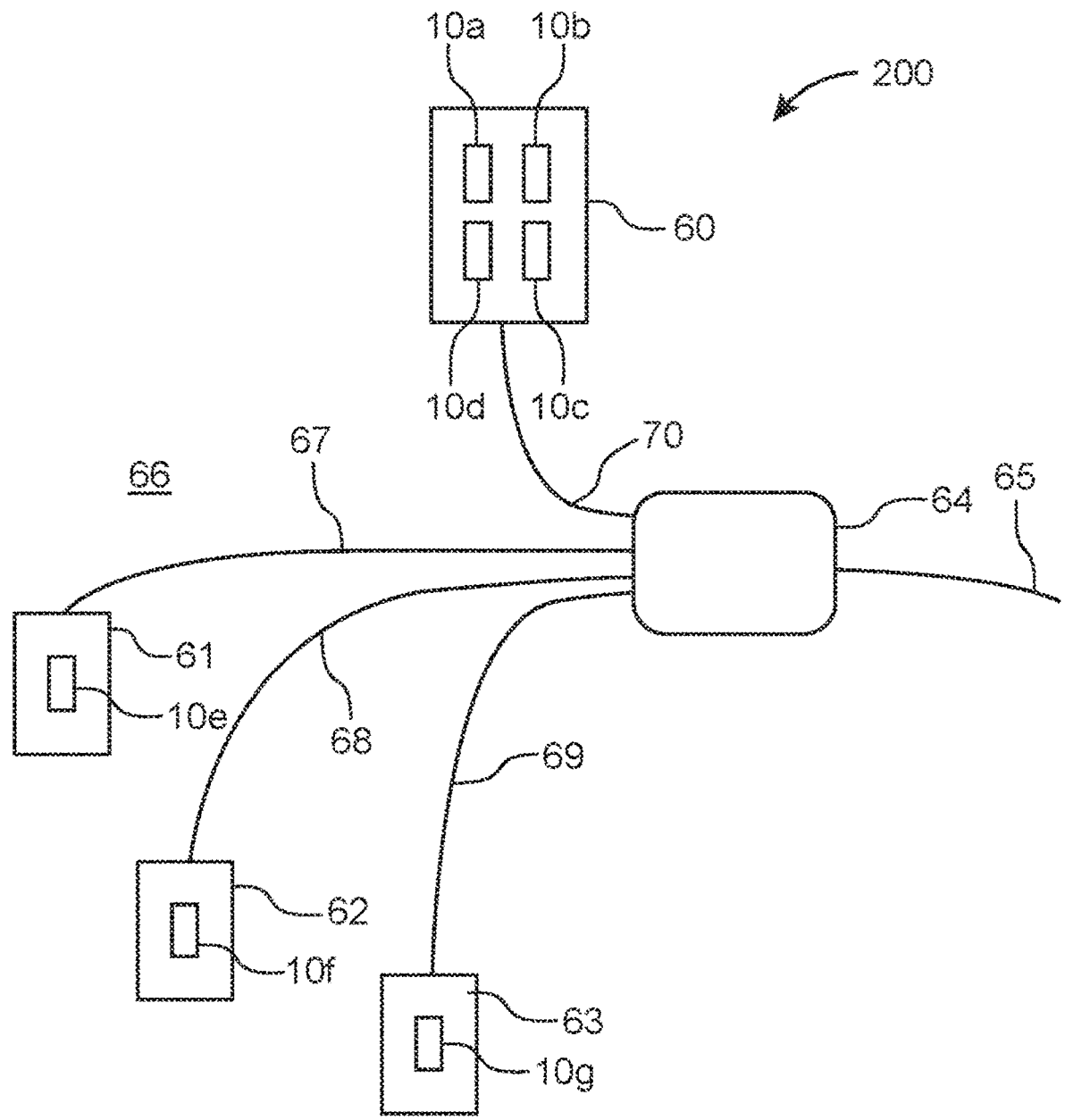
FIG. 7 illustrates a subsea production system comprising a plurality of wells.

FIG. 7 illustrates a subsea production system 200 comprising a plurality of wells. The subsea production system 200 is distributed on a sea floor 66 in the manner known in the art. The subsea production system 200 comprises a plurality of subsea trees 10a-g respectively connected to a well. Four subsea trees 10a-d are arranged in a four-slot template 60, whereas three subsea trees 10e-g are arranged individually as satellite trees, each having their own foundation 61-63. The foundations 61-63 may, for example, be a suction anchor base.

Each subsea tree 10a-g feeds the production fluids into a manifold 64 through appropriate subsea flowlines ("jumpers") 67-70, while the manifold 64 again directs the produced fluids to a remote location such as to shore or to a platform via a transport line 65.

The four-slot template 60 and the individual foundations 61-63 may have somewhat different requirements with respect to additional flowline connections to the subsea trees 10a-g. Fluid connectors at the underside of the tree may in particular not be easily accessible in a single-slot foundation 61-63. This may require a different tree design to be used in the satellite wells, compared to the tree design used for those wells in the four-slot template 60 (or may require a more complex or more expensive design of the foundations 61-63).

Figure 8:
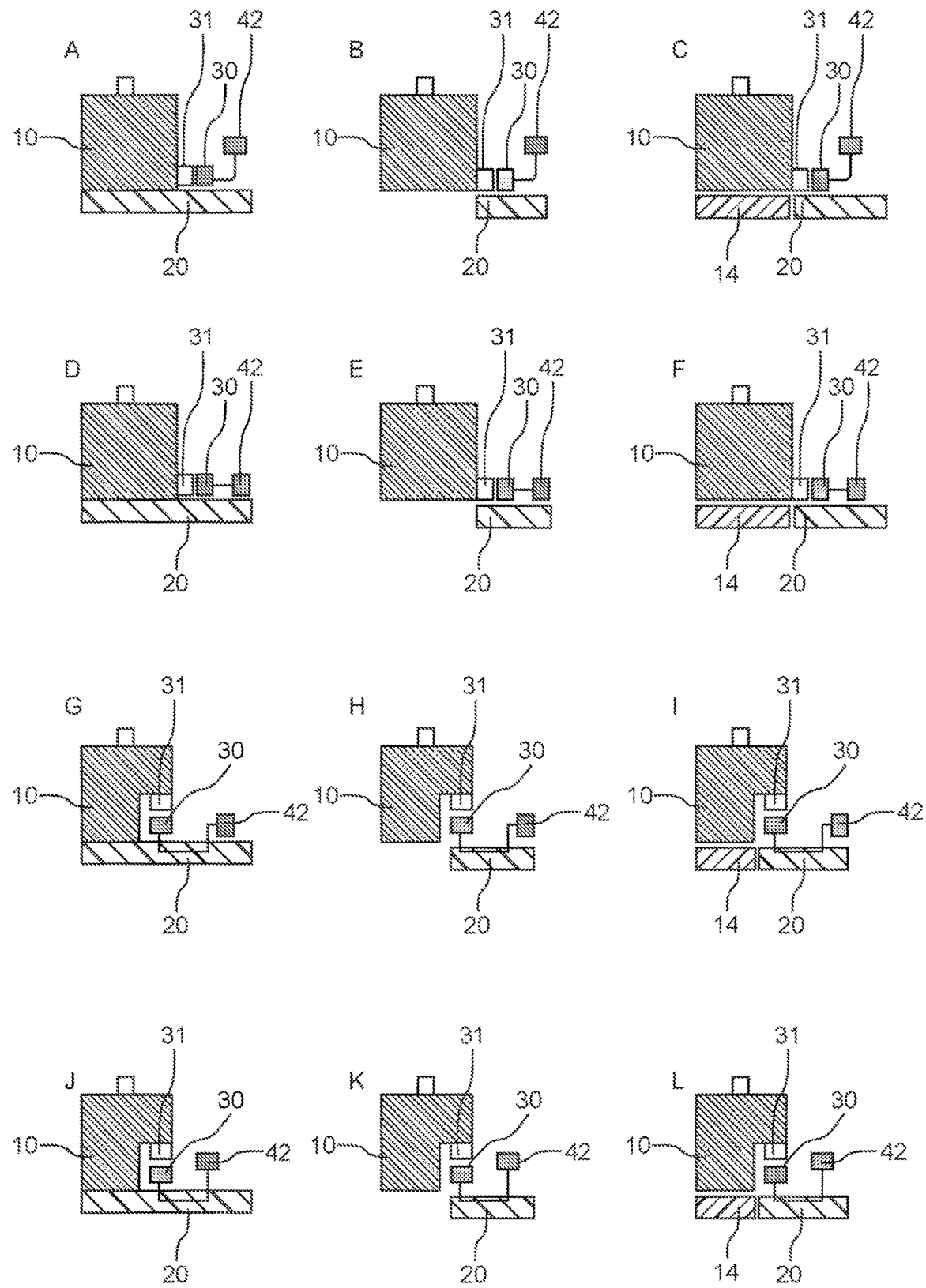
FIG. 8 illustrates alternative embodiments of an adapter assembly and a subsea tree.

FIG. 8 illustrates alternative embodiments of the adapter assembly 100 and subsea tree 10 in terms of the orientation of the connection elements 30,42. Subfigures A-C show horizontal to vertical connections, subfigures D-F show horizontal to horizontal connections, subfigures G-I show vertical to horizontal connections, and subfigures J-L show vertical to vertical connections.

As illustrated in subfigures A, D, G and J, the adapter base 20 may extend below the subsea tree 10 so that the subsea tree 10 is fully supported on the adapter base 20. As illustrated in subfigures B, E, H and K, the adapter base 20 may optionally be provided only partially under the subsea tree 10, or on the side of the subsea tree 10. Subfigures C, F, I and L illustrate various embodiments having an adapter base 20 and a frame 14.

By providing an adapter assembly 100 as described in the embodiments above, one may avoid (or reduce) the need for design changes to the trees that are used, for example, on the single-slot satellites. This allows the same fundamental tree design to be used on all wells, while still having the required connectivity, which is advantageous in terms of installation cost, maintenance, and replacements (for example, in that a single spare tree is suitable for all wells).

Figure 9:
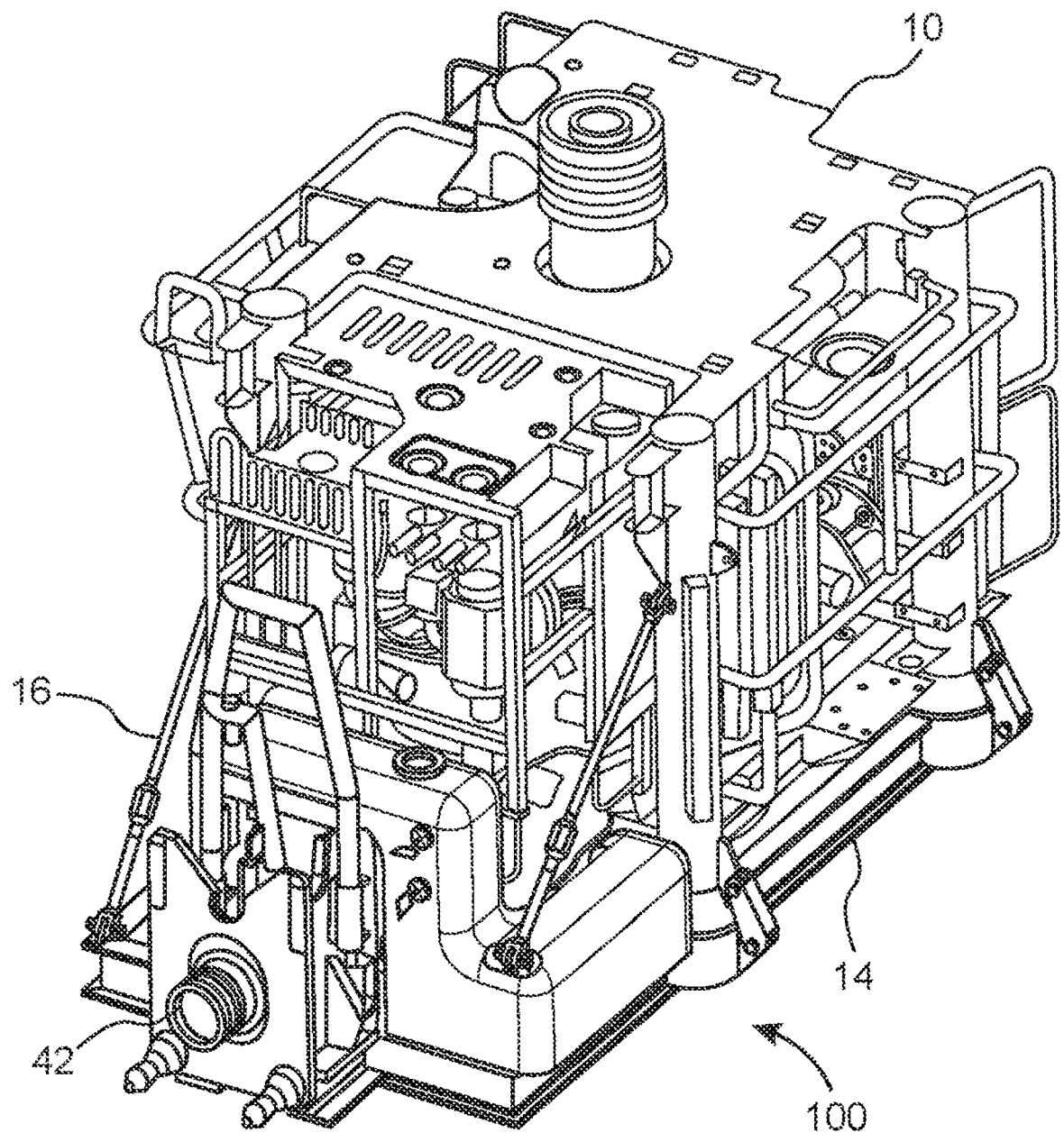
FIG. 9 shows a first view of an embodiment of an adapter assembly and a subsea tree.
Figure 10:
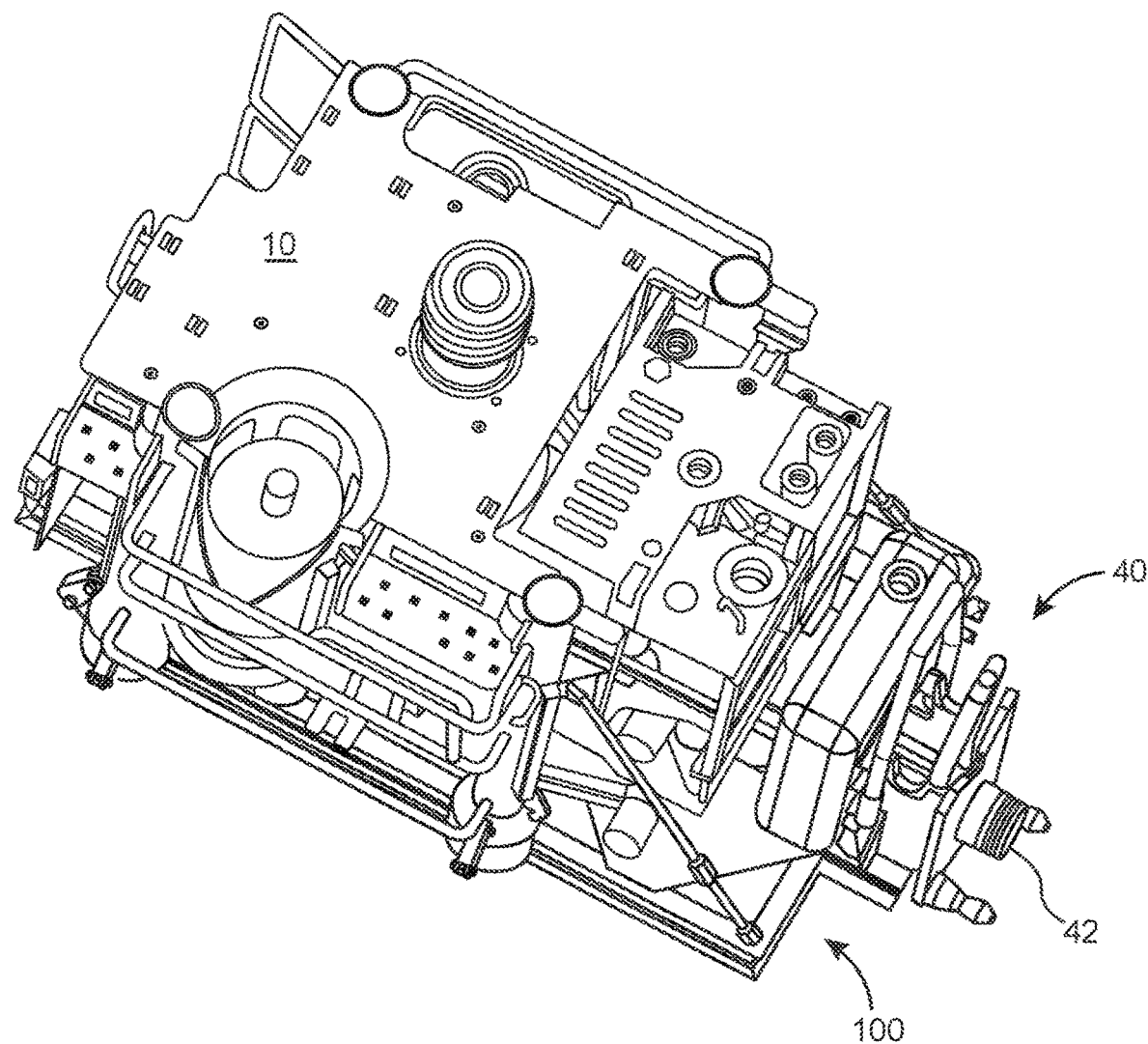
FIG. 10 shows a second view of an embodiment of an adapter assembly and a subsea tree.
Figure 11:
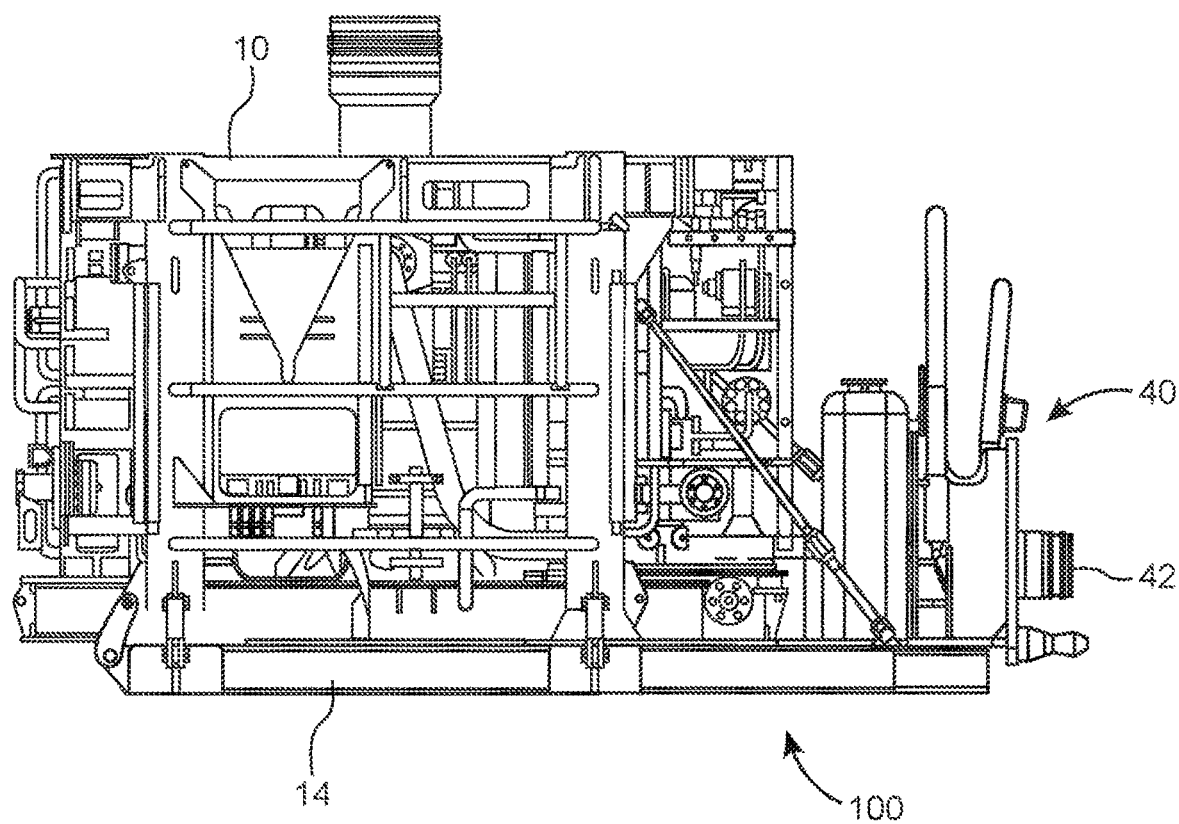
FIG. 11 shows a third view of an embodiment of an adapter assembly and a subsea tree.

FIGS. 9-11 show further perspectives of an adapter assembly 100 with a subsea tree 10 arranged thereon, where the reference numerals correspond to those used in the embodiments described above.

Figure 12:
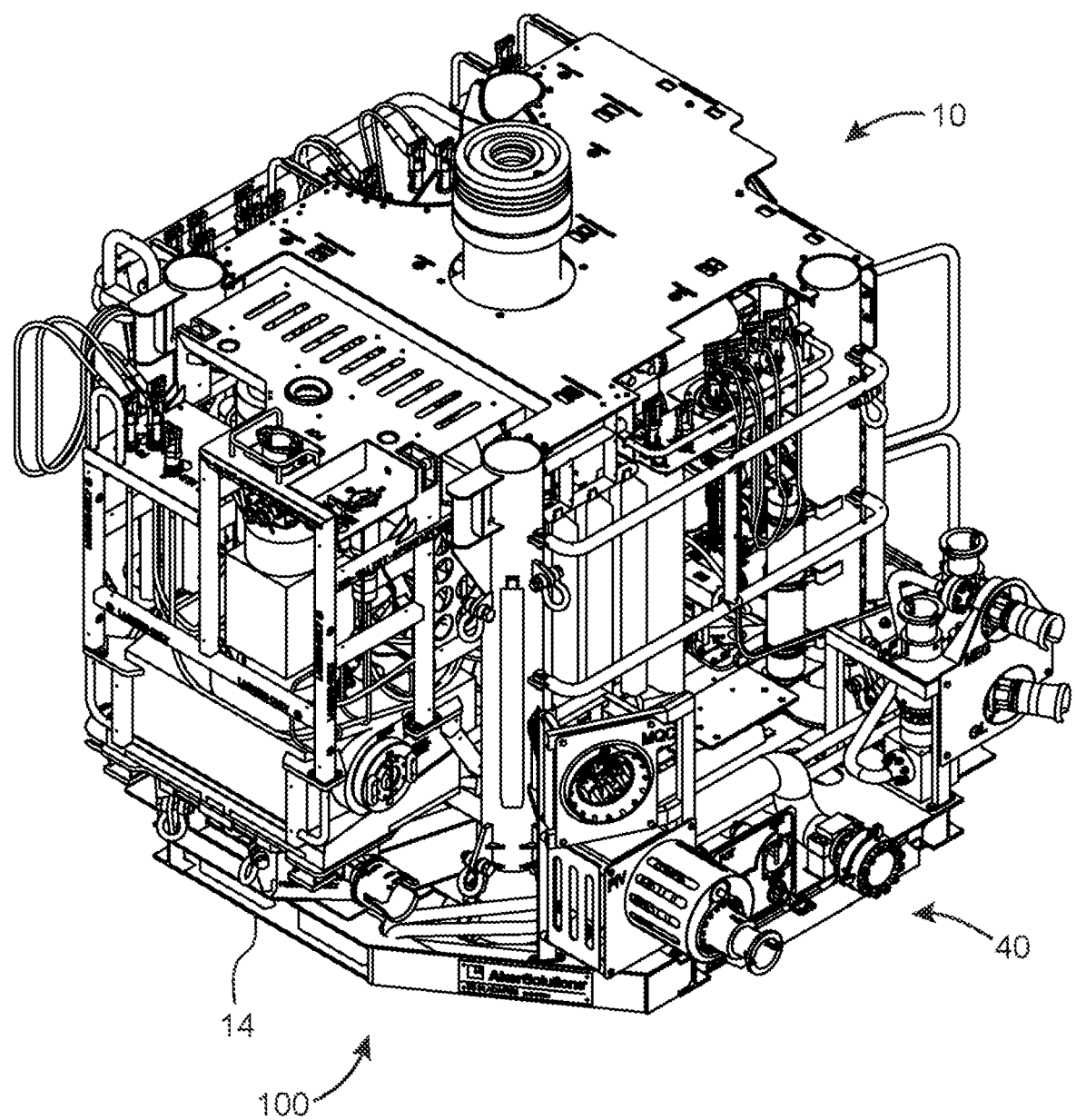
FIG. 12 shows an embodiment of an adapter assembly and a subsea tree.

FIG. 12 illustrates an adapter assembly 100 with a subsea tree 10 arranged thereon, where the reference numerals correspond to those used in the embodiments described above. The adapter assembly 100 as shown in FIG. 12 comprises a diver tie-in as part of the flowline connector assembly 40.

While the present invention has been described with reference to the embodiments mentioned above, it is to be understood that modifications and variations can be made without departing from the scope of the present invention, and such modifications and variations shall remain within the field and scope of the present invention. Reference should also be had to the appended claims.

LIST OF REFERENCE NUMERALS

10 Subsea tree
10a-g Subsea tree(s)
14 Frame
14' Opening
14a-d Mounting bracket(s)
14e Beam section
14f-g Leg(s)
16 Tension rod(s)
20 Adapter base
30 First connection element
31 Fluid line connector
40 Flowline connector assembly
42 Second connection element
44 Foldable unit
46 Guide pin
48 Multiple quick connector (MQC)
50 Flowloop(s)
60 Four-slot template/Multi-slot template
61 Foundation/Single-slot foundation
62 Foundation/Single-slot foundation
63 Foundation/Single-slot foundation
64 Manifold
65 Transport line
66 Sea floor
67 Subsea flowline
68 Subsea flowline
69 Subsea flowline
70 Subsea flowline
100 Adapter assembly
200 Subsea production system

What is claimed is:

1. An adapter assembly for connecting a flowline which comprises an end portion to a subsea tree which comprises a fluid line connector, the adapter assembly comprising:
an adapter base which comprises a frame which is configured to support a bottom portion of the subsea tree;
a first connection element which is connected to the adapter base and which is configured to connect to the fluid line connector of the subsea tree; and
a flowline connector assembly comprising a second connection element which is configured to connect to the end portion of the flowline, the flowline connector assembly being attached to the adapter base,
wherein,
the adapter assembly is configured to connect to the subsea tree via the first connection element,
the frame of the adapter base comprises connectors which are configured to provide a mechanical connection with the bottom portion of the subsea tree, and
the connectors which are configured to provide the mechanical connection with the bottom portion of the subsea tree further provide that the adaptor assembly is securable to the subsea tree prior to a deployment of the subsea tree and that the adaptor assembly remains secured to the subsea tree during an installation of the subsea tree on a subsea wellhead.

2. The adapter assembly as recited in claim 1, wherein, the fluid line connector is arranged on a side of the subsea tree and comprises a horizontally facing interface, and
the first connection element is further configured to connect to the fluid line connector which is arranged at the side of the subsea tree via the horizontally facing interface.

3. The adapter assembly as recited in claim 1, wherein, the fluid line connector is arranged on the bottom portion of the subsea tree and comprises a vertically downwards facing interface, and
the first connection element is further configured to connect to the fluid line connector which is arranged at the bottom portion of the subsea tree via the vertically downwards facing interface.

4. The adapter assembly as recited in claim 1, wherein the frame is further configured to fully support the subsea tree when placed on a horizontal surface.

5. The adapter assembly as recited in claim 1, wherein, the subsea tree further comprises an outer perimeter and an underside,
the frame comprises an opening, and
the frame is further configured to extend adjacent to the outer perimeter of the subsea tree so that the opening is adjacent to the underside of the subsea tree.

6. The adapter assembly as recited in claim 1, further comprising:
at least one flowloop which is arranged at least party within the adapter base,
wherein,
the first connection element is interconnected to the second connection element via the at least one flowloop.

7. The adapter assembly as recited in claim 1, wherein, the adapter base comprises a peripheral end, and
the flowline connector assembly is attached at the peripheral end of the adapter base.

8. The adapter assembly as recited in claim 1, wherein the first connection element is oriented vertically or horizontally.

9. The adapter assembly as recited in claim 1, wherein the second connection element is oriented vertically or horizontally.

10. The adapter assembly as recited in claim 1, wherein the first connection element and the second connection element have a same orientation or a different orientation.

11. The adapter assembly as recited in claim 1, wherein the flowline connector assembly further comprises a guide member.

12. The adapter assembly as recited in claim 11, further comprising:
a retractable unit,
wherein,
the guide member is arranged on the retractable unit.

13. The adapter assembly as recited in claim 1, further comprising the subsea tree fixed thereto.

14. A subsea production system comprising:
a plurality of subsea trees at least one of which comprises the adapter assembly as recited in claim 1;
a multi-slot template; and
a single-slot foundation,
wherein,
at least one of the plurality of subsea trees is provided in the multi-slot template, and at least another one of the plurality of subsea trees is provided in the single-slot foundation.

15. A method of installing a tree on a subsea wellhead, the method comprising:
   securing the adapter assembly as recited in claim 1 to the tree by using the connectors to mechanically connect the adapter assembly to the bottom portion of the tree; and then
   deploying and installing the tree, with the adapter assembly secured thereto, on the subsea wellhead.

16. An adapter assembly for connecting a flowline which comprises an end portion to a subsea tree which comprises a fluid line connector, the adapter assembly comprising:
   an adapter base;
   a first connection element which is connected to the adapter base and which is configured to connect to the fluid line connector of the subsea tree;
   a flowline connector assembly comprising a second connection element which is configured to connect to the end portion of the flowline, the flowline connector assembly being attached to the adapter base; and
   at least one flowloop which is arranged at least party within the adapter base,
   wherein,
   the adapter assembly is configured to connect to the subsea tree via the first connection element, and
   the first connection element is interconnected to the second connection element via the at least one flowloop.

* * * * *